(12) United States Patent
Memory et al.

(10) Patent No.: US 8,985,036 B2
(45) Date of Patent: *Mar. 24, 2015

(54) SOIL GATHERING MODULE FOR SOIL OPENER

(75) Inventors: Russell J. Memory, Saskatoon (CA); Martin Roberge, Saskatoon (CA); Jim W. Henry, Saskatoon (CA)

(73) Assignee: CNH Industrial Canada, Ltd., Saskataoon, Saskatchewan (CA)

( * ) Notice: Subject to any disclaimer, the term of this patent is extended or adjusted under 35 U.S.C. 154(b) by 245 days.

This patent is subject to a terminal disclaimer.

(21) Appl. No.: 12/826,296

(22) Filed: Jun. 29, 2010

(65) Prior Publication Data

US 2011/0315057 A1    Dec. 29, 2011

(51) Int. Cl.
*A01C 7/06* (2006.01)
*A01C 5/08* (2006.01)
*A01C 5/06* (2006.01)

(52) U.S. Cl.
CPC .. *A01C 5/062* (2013.01); *A01C 7/06* (2013.01)
USPC ............................ 111/152; 111/175; 111/186

(58) Field of Classification Search
CPC .................................. A01C 5/062; A01C 7/06
USPC ................ 111/118–120, 149, 152, 174, 175, 111/186–188, 170, 123–129; 172/721–733; 37/452
See application file for complete search history.

(56) References Cited

U.S. PATENT DOCUMENTS

| | | |
|---|---|---|
| 2,684,617 A | 7/1954 | Johnston |
| 4,195,697 A | 4/1980 | Griffin |
| 4,765,263 A | 8/1988 | Wilkins |
| 5,333,559 A | 8/1994 | Hodapp et al. |
| 5,415,236 A | 5/1995 | Williams |
| 5,495,814 A | 3/1996 | Primus |
| 6,302,040 B2 | 10/2001 | Lempriere |
| 6,357,368 B1 | 3/2002 | Swab et al. |
| 6,397,767 B1 | 6/2002 | Dietrich, Sr. |
| 6,405,665 B1 | 6/2002 | Henry et al. |
| 6,966,270 B2 | 11/2005 | Rowlett et al. |
| 7,104,341 B2 | 9/2006 | Steinlage et al. |

*Primary Examiner* — Christopher J Novosad
(74) *Attorney, Agent, or Firm* — Rebecca L. Henkel (57) ABSTRACT

A soil opener has a frog mount adapted to be coupled to a shank or other mounting member of a farm implement. A spreader is removably coupled to the frog mount and includes forward and rearward product delivery channels that are intended to be flow-coupled to product delivery tubes or hoses of the farm implement. A tip is removably coupled to the spreader. The leading edges of the frog mount, the spreader, and the tip, as well as the geometry between these components are such that drift is minimized even when the soil opener is pulled through the soil at higher speeds, e.g., excess of 5 mph. The soil opener may be equipped with an optional soil gathering module that gathers soil lifted by the tip and redirects the soil to a position generally rearward of the opener.

18 Claims, 8 Drawing Sheets

SOIL GATHERING MODULE FOR SOIL OPENER

BACKGROUND AND SUMMARY OF THE INVENTION

The present invention is directed to a soil opener for cutting a furrow into a planting surface and, more particularly, to a soil opener having a soil gathering module.

Conventional furrow cutting devices are designed to be pulled through the planting surface ("soil") at speeds between three and five miles per hour. The shape, size, and geometry of the devices is such that the amount of soil thrown as the furrow is cut and the profile about which seed and/or fertilizer is deposited assumes that the implement to which the furrowing devices are attached will be pulled by a tractor, or other towing vehicle, at approximate four miles per hour. If the implement is pulled at higher pull or operating speeds, e.g., eight miles per hour, the soil displaced as the furrow is cut will be thrown much higher and farther outward compared to that when the implement is towed at about four miles per hour.

The increased soil displacement resulting from the furrowing device being pulled through the soil at the higher speeds adversely affects fertilizer and seed placement as the retaining effect of the soil on the product being placed has changed. Moreover, since the displacement of the soil is substantially exaggerated at the higher speeds, less soil is available for covering the furrow after the furrowing forming device has passed. Less soil leads to improper soil covering of the seed and fertilizer as well as more pronounced furrows. Additionally, the draft requirement is increased by the soil to furrowing cutting device interaction.

The present invention is directed to a furrow forming device ("soil opener") that is suited for use at higher pull speeds, e.g., speeds in excess of five miles per hour. In accordance with one aspect of the invention, the soil opener has a soil gathering module that gathers soil as the soil is lifted by the soil opener and redirects it rearward of the opener as the opener is pulled through the soil. The soil gathering module is comprised of a pair of outward and rearward extending members mounted to opposite sides a frog mount that is used to attach a furrowing tip to a shank of a farm implement. The members may be formed to have tines that cut into the soil as the opener is pulled through the soil and are shaped such that soil is pushed inward toward the center of the furrow. The soil gathering module may be pivotally attached to the frog mount so that the module may pivot in response to contact with field obstructions. In one embodiment, a damper, e.g., spring, is used to provide a consistent downforce on the members as the opener is pulled through the soil.

It is therefore an object of the invention to provide a soil opener usable at higher speeds.

It is another object of the invention to provide a soil opener that causes less soil disturbance during furrowing of soil and placement of seed and/or fertilizer.

It is a further object of the invention to provide a soil opener that gathers soil lifted during furrowing and redirects the gathered soil rearward of the soil opener.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
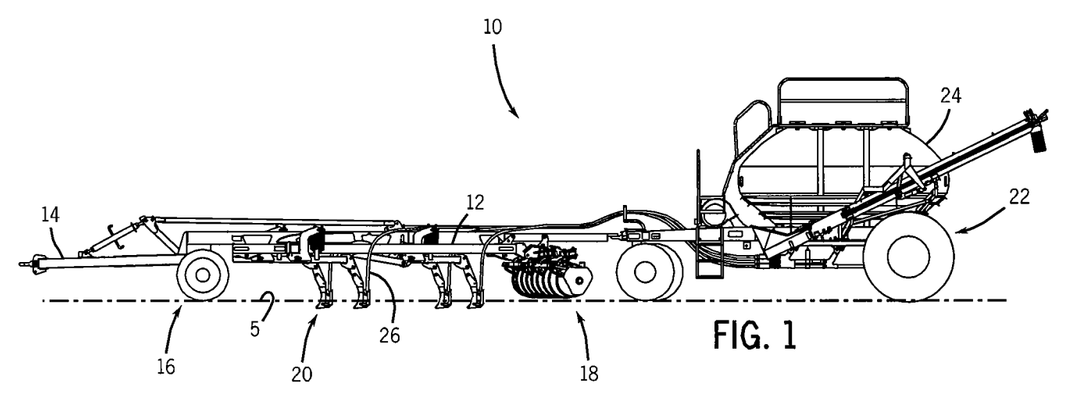
FIG. 1 is a pictorial view of a planting system having an air car and a farm implement incorporating a soil opener according to the present invention.

Referring now to FIG. 1, an air hoe drill 10 is designed to form multiple furrows in a surface, e.g., farm field, and deposit seed and/or fertilizer in the furrows. The air hoe drill 10 is representative of one type of agricultural implement with which the present invention may be used. Generally, the drill 10 includes a frame 12 coupled in a known manner to a tow bar 14 that facilitates attachment of the frame 14 to a tractor (not shown) or other towing vehicle. The frame 12 is supported above the planting surface S by a series of forward wheels 16 and rear packing wheels 18. As known in the art, the packing wheels 18 not only support the frame 12 but also serve to pack the furrows after seed and/or fertilizer has been deposited. In this regard, the packing wheels 18 are aligned with a series of soil openers 20 that are mounted in a known manner to the frame 12. The depth of the soil openers 20 can be set and adjusted by raising and lowering the frame 12 relative to the wheels 16, 18 as known in the art. In one representative embodiment, the soil openers 20 are equally spaced from one another in a direction transverse to the path of travel of the drill 10. The drill 10 further includes an air cart 22 that includes a tank 24 for carrying seed and/or fertilizer. The particulate is fed from the tank 24 to the individual soil openers. One skilled in the art will appreciate that the air hoe drill shown in FIG. 1 is merely representative of one type of agricultural implement that can incorporate the present invention. For example, the invention may also be applicable with a precision air hoe drill where the frame is supported by a set of forward wheels and a set of rearward wheels, and having a series of trailing arms and/or parallel links to which soil openers such as those described herein may be substantially attached together with packer wheels.

Turning now to FIGS. 2-8, an exemplary soil opener 20 according to one embodiment of the invention is generally comprised of four components or modules: a frog mount 26, a spreader 28, a lower tip 30, and a soil gathering module 32. As will be described with respect to FIGS. 9 and 10, the soil opener 20 may also be equipped with an optional soil gathering module 32. The spreader 28 and tip 30 are coupled to the frog mount 26, which in turn, is coupled to a shank 34 extending downwardly from the frame 12 of the drill 10. It will be appreciated that the modular arrangement of the soil opener 20 allows different spreaders 30 and tips 32 to be interchangeably coupled to the mount 26. As will be explained in greater detail below, the tip 30 cuts a furrow in the soil and seed and/or fertilizer (hereinafter, "particulate matter") is deposited into the furrow at a width defined by the spreader 28. The interchangeability of the tip 30 and the spreader 28 thus allows new tips to be attached to the mount 26 when needed, whether because the tip has become worn or a different tip style is warranted, or a new spreader to be attached to the mount 26 if a spreader that provides a wider or narrow spread of particulate matter is desired.

Figure 2:
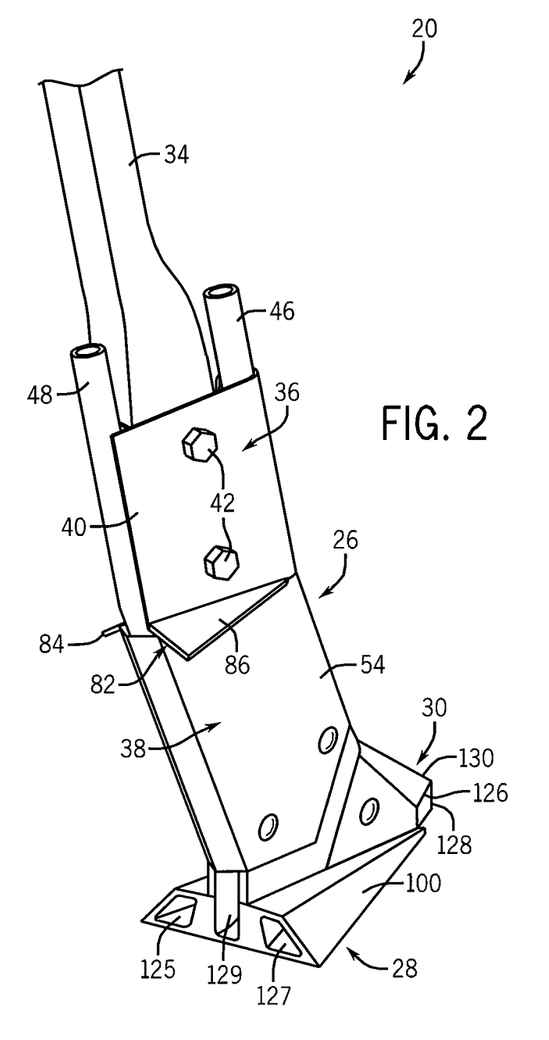
FIG. 2 is an isometric view of the soil opener of the farm implement of FIG. 1.
Figure 8:
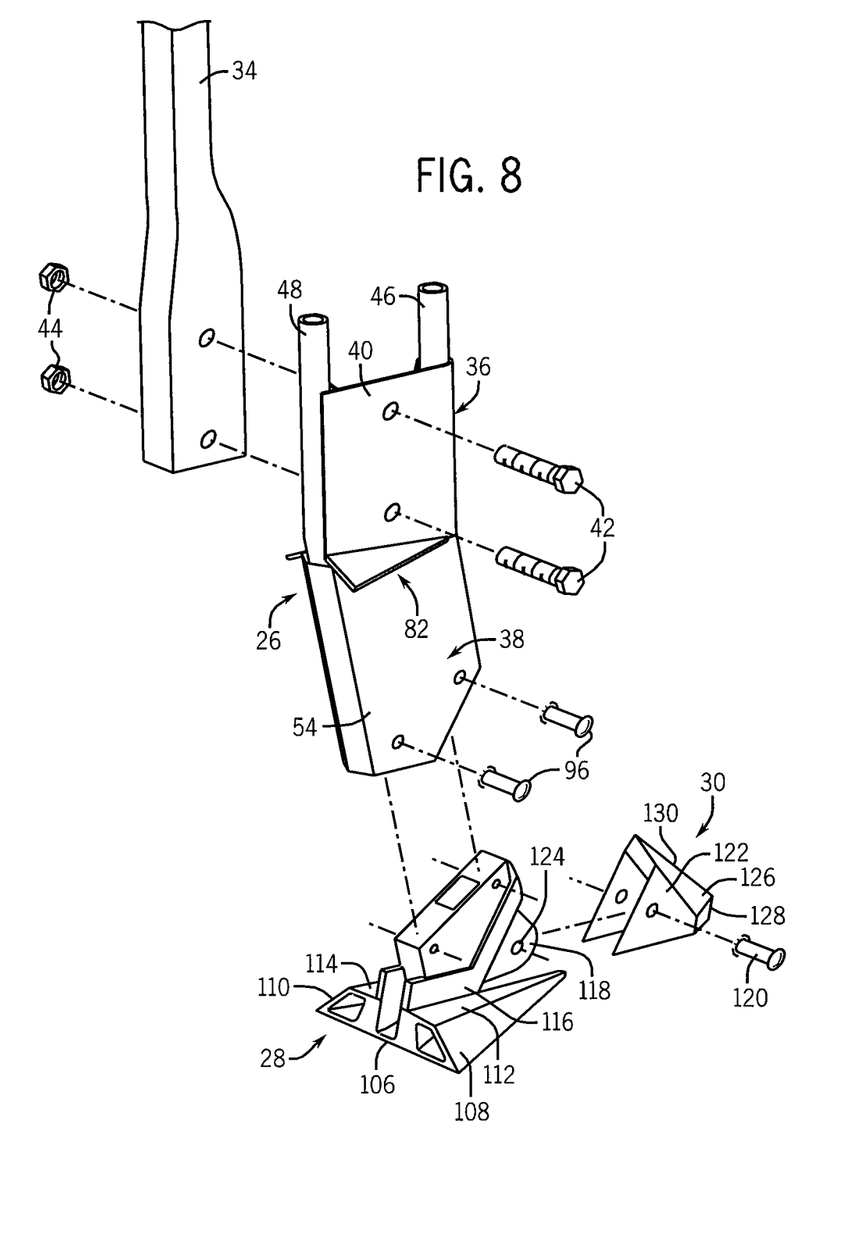
FIG. 8 is an exploded view of the soil opener of FIG. 2.

The mount 26, which may be fabricated from sheet metal, is generally comprised of an upper portion 36 and a lower portion 38. The upper portion 36 has a mounting flange 40 that is coupled to the shank 34 by a pair of bolts 42 that may be passed through openings (not numbered) in the flange 40 and shank 34. Nuts 44 may then be used in a conventional manner to engage the ends of the bolts 42 to attach the flange 40 to the shank 34. First and second product delivery tubes 46, 48, respectively, are carried by the flange 40 and, in a preferred embodiment, are integrally formed with the flange 40. In a preferred embodiment, the first and second delivery tubes 46, 48 are mounted forward and aft of the shank 34 and are flow-coupled using conduits (not shown) to the air cart 22 or other source of particulate matter as known in the art. The product delivery tubes 46, 48 empty into the spreader 28. It will be appreciated that the delivery tubes 46, 48 are constructed to interface with a standard supply hose, such as a 1" plastic delivery hose, and transition to a flattened profile (not shown) at the lower end of the tubes.

Figures 3, 4:
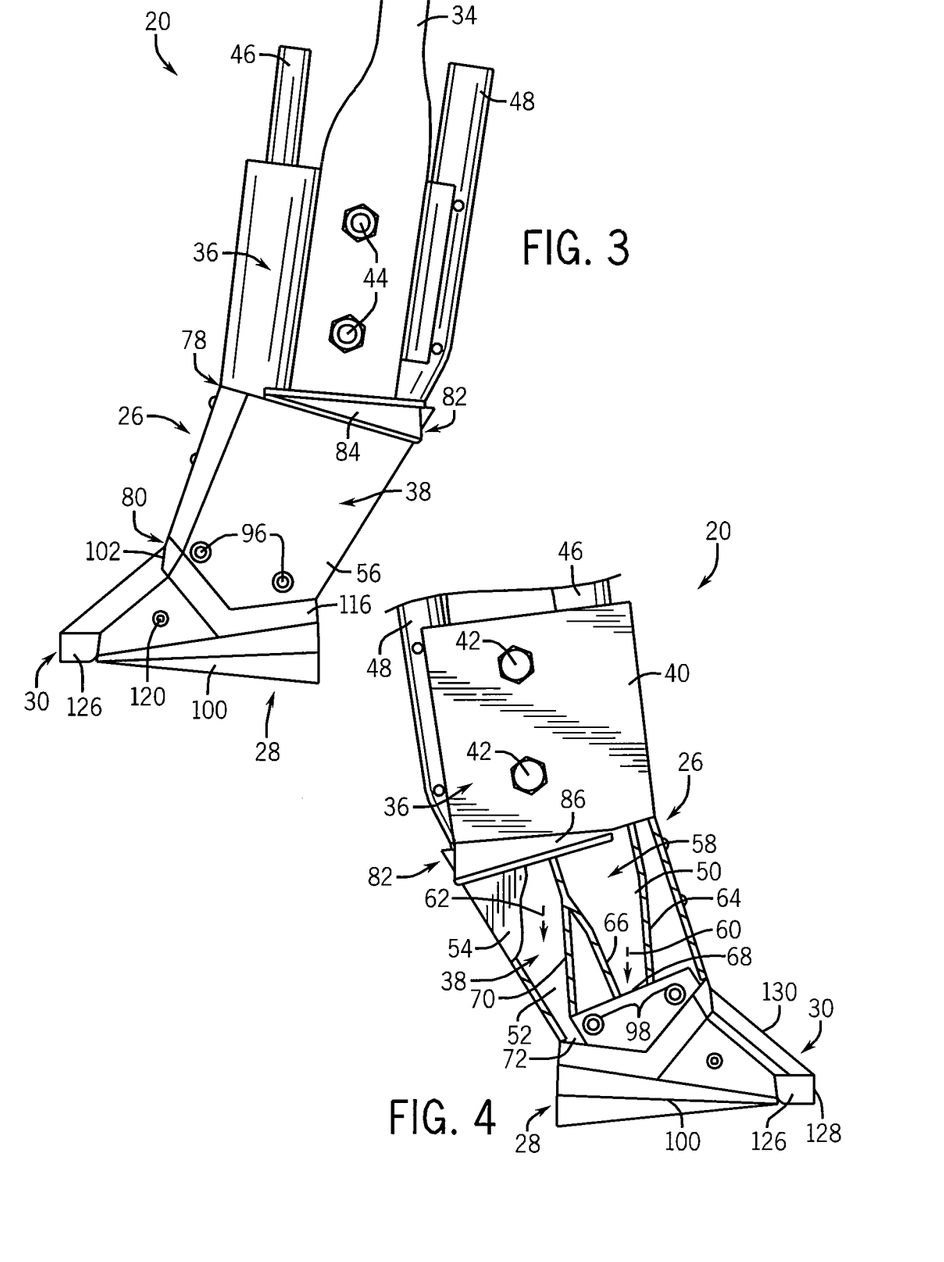
FIG. 3 is left elevation view of the soil opener of FIG. 2.
FIG. 4 is a right elevation view of the soil opener of FIG. 2.

Referring particularly now to FIG. 4, it can be seen that the lower mount portion 38 of the frog mount 26 has a pair of delivery channels 50, 52 that communicate with delivery tubes 46, 48, respectively. The lower mount portion 38 has a pair of housing members 54, 56 that when conjoined together define a hollow interior 58 within the lower mount portion 38. The hollow interior 58 is segmented into a pair of passages 60, 62 that are in fluid communication with the pair of delivery tubes 46, 48, respectively. More particularly, the lower mount portion 38 includes a first and a second divider 64 and 66 arranged generally upright within the interior 58 and angled toward one another such that passage 60 funnels from the delivery channel 50 to a forward outlet 68 that opens onto the spreader 28. The lower mount portion 38 further has a third divider 70 that together with rear edges of the housing members 54, 56 define the rearward passage 62, which funnels from the rearward delivery channel 52 to an outlet 72 that opens onto the spreader 28. It will thus be appreciated that the dividers are effective in maintaining separation between the products that is passed through the respective delivery channels 50, 52. In one embodiment, seed is passed through the forward delivery channel 50 and fertilizer is passed through the rearward delivery channel 52.

Figure 5:
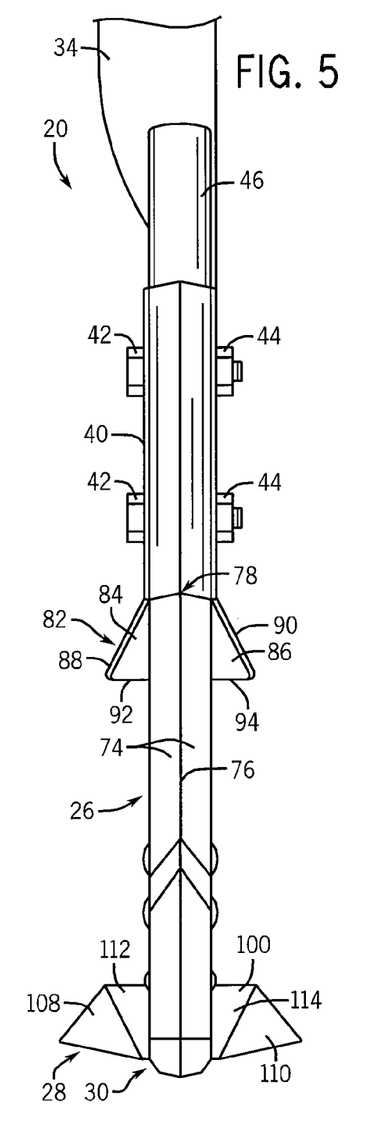
FIG. 5 is a front elevation view of the soil opener of FIG. 2.
Figure 6:
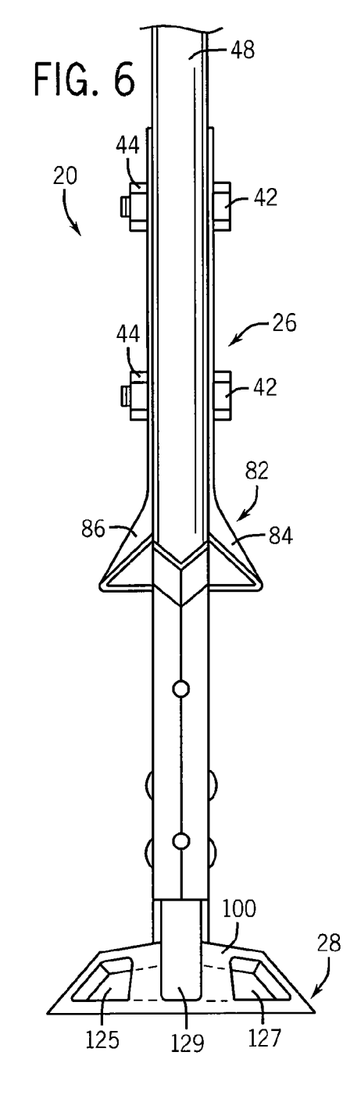
FIG. 6 is a rear elevation view of the soil opener of FIG. 2.

It will be appreciated that the shank 34 converges to a relatively narrow width, as shown in FIG. 5, and the frog mount 26 is attached to the lower end of the shank 34 so that it is centered on the shank 34. As is particularly well illustrated in FIG. 5, the leading surface 74 of the frog mount 26 has an exposed width that is generally matched to the width of the lower end of the shank 34. The reduced width of the frog mount 26 assists in minimizing soil disturbance as the soil opener 20 is pulled through the soil. Moreover, the mount 26 is designed such that it has a narrow cross-section extending, in one embodiment, eight (8) inches above the tip 30. The leading surface 74 of the mount 26 converges to a narrow ridge 76 having an included angle, than in one preferred embodiment, is less forty-five (45) degrees. This angle reduces the entry angle of the mount 26 into the soil lifted by the tip 30 so to reduce lateral soil disturbance.

The upper portion 36 and the lower portion 38 of the mount 26 converge at point 78 that has an interface angle between approximately ten (10) degrees and approximately twenty (20) and, in a preferred embodiment, fifteen (15) degrees. In a preferred embodiment, the interface point 78 is approximately four and one-half (4.5) and five (5) inches above a lower interface angle created at the interface, shown at 80, between the lower end of the frog mount and the leading edge of the tip 30. With this construction, soil interaction with the leading edge of the mount 26 is efficiently separated to flow around frog mount 26.

The frog mount 26 also has a venting structure 82 that is comprised of an expanded opening (not shown) extending horizontally across the frog mount 26 at the interface between the upper and lower mount portions 36, 38. The opening is covered by a pair of angled fins 84, 86 extending laterally outward. The fins 84, 86 are preferably integrally formed with the frog mount 26 and have downward sloping upper walls 88, 90, and horizontal lower walls 92, 94. The width of the fins 84, 86 increases from front-to-rear. The venting structure 82 allows air delivered to the soil opener 20 through the delivery channels 50, 52 to be vented rearward. Venting the air reduces the amount of air that discharged with the product and thus reduces the extent of product disturbance when the product is deposited.

Figure 7:
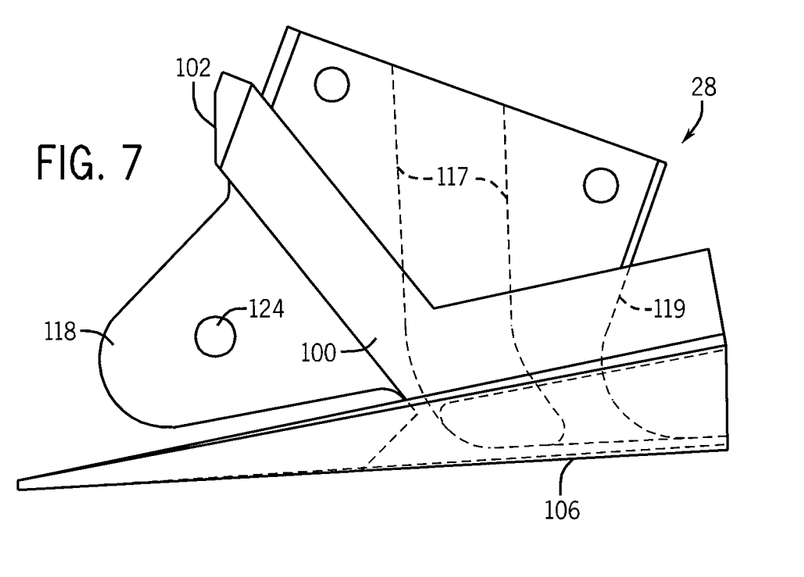
FIG. 7 is a side elevation view of the spreader of the soil opener of FIG. 2.

The spreader 28 attaches to the lower mount portion 38 of the frog mount 26 by bolts 96 and nuts 98. The soil opener 20 is constructed such that different spreaders may be interchangeably attached to the frog mount 26 when a wider or narrower product delivery pattern is required. The spreader 28 is constructed to have a body 100 that diverges outward in width at an angle to achieve a desired spreading width. As will be described, the tip 30 is attached to the spreader 28. The leading edge 102 of the body 100 is coincident with the leading edge of the frog mount 26. As best shown in FIGS. 3 and 7, the leading edge of the spreader 28 and the leading edge of the tip 30 abut one another at interface 80. In one embodiment, the spreader 28 and the tip 30 are constructed and oriented so that the angle between the leading edges of the spreader 28 and the tip 30 at interface 80 is between twenty-five (25) and thirty (30) degrees, and preferably approximately twenty-eight (28) degrees. Additionally, the interface 80 is approximately 3.5 to 4.5 inches above the lower edge of the spreader 28, and preferably three (3) inches above the lower edge of the spreader 28. The placement of the interface and the angle between the spreader 28 and the tip 30 is believed to provide even horizontal division of soil as the soil opener 20 is pulled through the soil.

The lower edge or base 106 of the spreader 28 slopes upward away from the direction of travel (front to back in the figure). In one embodiment, the slope is approximately two (2) degrees. The sloping of the base 106 decreases draft as the soil opener 20 is pulled through the soil without causing significant soil buildup. The outer walls 108, 110 of the spreader 28 slope inwards from the base to direct soil upward and outward to also reduce drag of soil. The spreader 28 also has top panels 112, 114 that slope upward away from the direction of travel, and preferably at an angle of approximately five (5) degrees. It will thus be appreciated that the spreader 28 provides a growth in depth that permits sufficient volume in the soil to be developed to allow product from the forward delivery tube 46 to pass rearward and outward through the spreader 28. Additionally, the top panels 112, 114 slope upwards from their outer edge to interface with the vertical wall 116 of the spreader 28 which is coincident with the sidewalls of the frog mount 26. This rising surface is believed to reduce buildup of soil at the interface of the top panels and the vertical wall of the spreader 28.

As referenced above, product is passed through the delivery channels 50, 52, into the lower section of the frog mount 26, and out of the outlets 68, 72 into the spreader 28. The hollow body of the spreader 28 has a curved delivery profile formed by curved walls 117 formed in a forward portion of the spreader 28. The curved delivery profile is in fluid communication with the forward delivery channel 50. The curved walls 117 are angled rearward so that product that is passed through the forward delivery channel 50 is directed rearward. The spreader 28 may also have an internal deflector (not shown) that deflects the product radially outward toward the outer walls of the spreader 28. In this regard, the product from the forward delivery channel 50 is placed in parallel rows outwardly according to the width of the spreader 28.

The spreader 28 also has a rear curvature 119 that directs product from the rear delivery channel 52 rearward and ultimately into the trench via outlets 125, 127. The rear curvature 119 is generally centered between the fins 84, 86 and, as such, unlike the product that is passed through the forward delivery channel 50, product passed through the rear delivery channel 52 and outlet 129 is kept to a narrower profile and is generally centered in the trench formed by the soil opener 20.

As best shown in FIG. 7, the spreader 28 has a forward extending flange 118 to which tip 30 attaches via fastener 120. More specifically, the tip 30 has hollow body 122 that effectively defines a slot that allows the tip to be slid onto the mounting flange 118. Once slid onto the flange, an opening (not numbered) formed in the tip body 122 aligns with opening 124 of the mounting flange 118. Once aligned, fastener 120 may be passed through the aligned openings to secure the tip 30 to the spreader 28.

The tip 30 is centered between the pair of upper panels 112, 114 of the spreader 28. The tip 30 is the first point of contact of the soil opener 20 with the soil as the soil opener 20 is pulled through the soil. The construction of the tip 30 and its attachment with the spreader 28 is designed to limit the rise velocity of the soil as the tip 30 is pulled through the soil without unduly increasing the drag.

The tip 30 has a nose 126 that is preferably formed of carbide or similar material. The nose 126 slopes upward and rearward at approximately fifteen (15) degrees. This sloping face, generally designated by reference numeral 128, intersects with a continuing face 130 that slopes upward and rearward. In one embodiment, the continuing face slopes at angle of approximately forty-five (45) degrees. As best shown in FIG. 5, faces 128, 130 form a vertical wedge radiating rearward and outward, and having an included angle of approximately thirty (30) degrees; although, different angles are possible.

Figure 9:
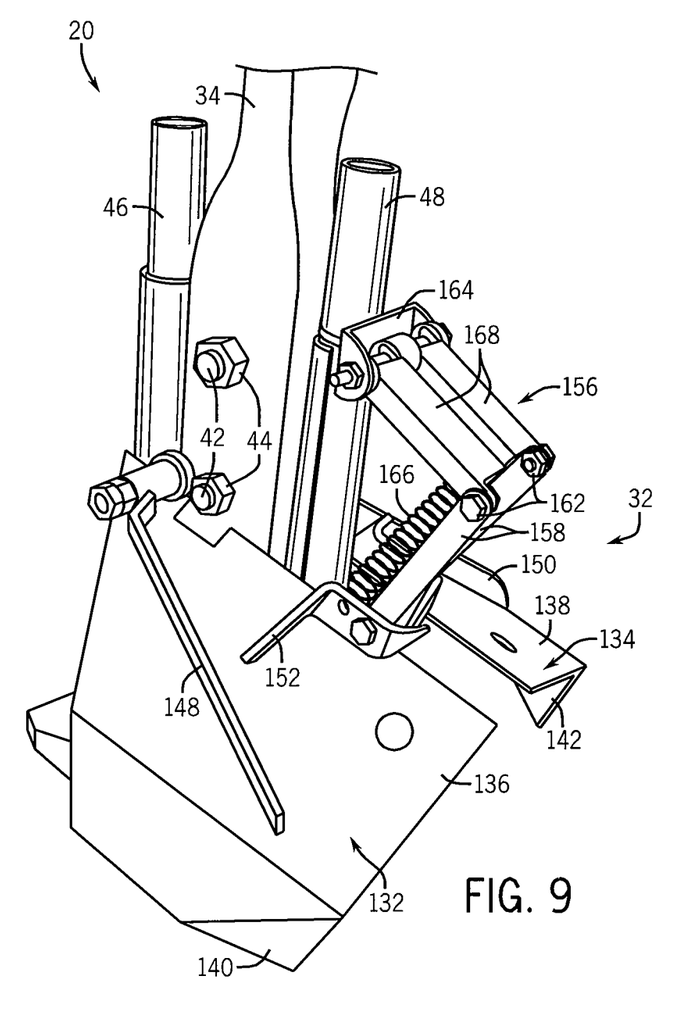
FIG. 9 is an isometric view of the soil opener of FIG. 2 with an optional soil gathering module.
Figure 10:
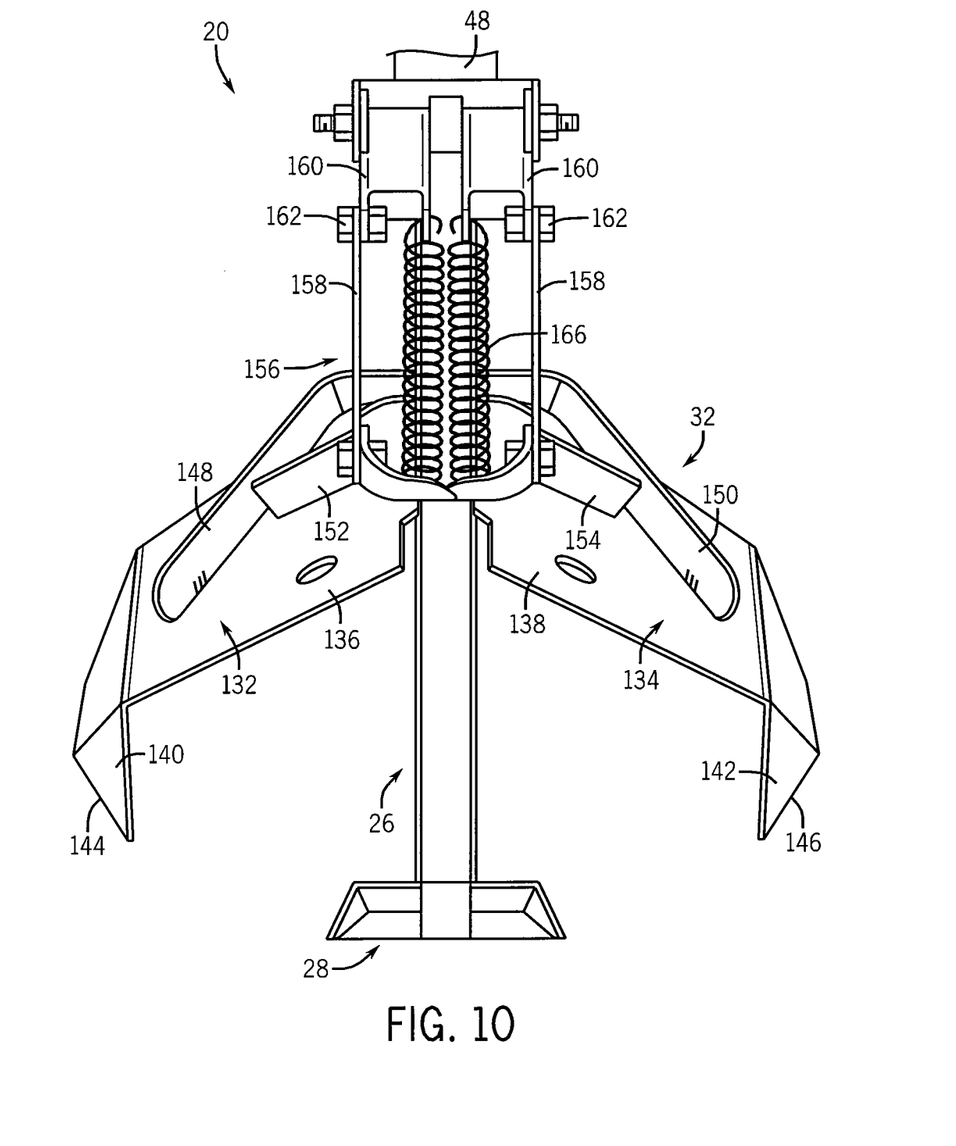
FIG. 10 is a rear elevation view of the soil opener of FIG. 9.

As noted above, the soil opener 20 may be equipped with a soil gathering module 32. As best shown in FIGS. 9 and 10, the soil gathering module 32 includes wings 132, 134 adjacent opposite sides of the frog mount 26. In one preferred embodiment, the wings 132, 134 are mounted symmetrically to the frog mount 26 at, or above, the venting structure 82. The wings 132, 134 gather soil that has been lifted as the soil opener 20 is pulled through the soil and redirects the gathered soil rearward behind the opener 20. In this regard, the wings 132, 134 have members 136, 138, respectively, that extend outward, rearward, and downward from a point tangent to forward delivery tube 46. Each member 136, 138 has a downwardly extending tine 140, 142 that, as shown best in FIG. 10, has respective points 144, 146 that are angled inwardly. In a preferred embodiment, the tines and points are formed by bending the outer ends of the wing members 136, 138; although, different manufacturing techniques may be used. The tines and inwardly bent points are designed to deflect flowing soil behind the opener 20.

The soil gathering module 32 further includes a pair of outer plates 148, 150 that are attached, e.g., weld, to a top surface of the wing members 136, 138. The outer plates 148, 150 assist in radiating soil outward and rearward. In addition to outer plates 148, 150, the soil gathering module 32 includes a pair of angled, inner plates 152, 154 that provide structural support.

The wings 132, 134 are attached to the frog mount 26 by a hinge arrangement 156 that generally includes a lower linkage 158 connected to an upper linkage 160 by a pivot connection 162. In one embodiment, a saddle 164 is fit over the rear delivery tube 48 and is coupled to an upper end of the upper linkage 160. This connection fixes the position of the soil gathering module 32 relative to the frog mount 26. A damper 166 is interconnected between the wings 132, 134 and the upper linkage 160. The pivot connection 162 allows the wings 132, 134 to rotate about an axis of rotation that is perpendicular to the direction of travel. Thus, when the soil gathering module 32 encounters a field obstruction, the wings 132, 134 may rotated upward about pivot connection 162 until the field obstruction is cleared. The damper 166 returns the wings 132, 134 to their normal operating position quickly after the field obstruction has been cleared. Moreover, the damper 166 provides a substantially constant downpressure on the wings 132, 134 so that the wings 132, 134 do not undesirably oscillate as the soil opener 20 is pulled through the soil. It will be appreciated that different soil gathering modules may be interchangeably mounted to the soil opener 20. This interchangeability allows a user to change the soil gathering module as desired to achieve a desired soil gathering and soil redirection profile.

It will therefore be appreciated that the present invention provides a soil opener that causes less soil disturbance and less soil throwing than conventional soil openers. Moreover, the present invention provides a soil opener that causes more displaced soil to fall over the product thereby leaving less of furrow after the soil opener has passed. The soil opener also provides product placement at consistent width and elevation. The soil opener also has an optional soil gathering module.

Many changes and modifications could be made to the invention without departing from the spirit thereof. The scope of these changes will become apparent from the appended claims.

We claim:

1. A soil opener adapted to be attached to an agricultural implement for placement of product in a furrow formed in soil, comprising:
   a mount configured to be coupled to a shank of the agricultural implement, the mount having a leading edge for separating the soil as the soil opener is pulled through the soil;
   a spreader coupled to a lower end of the mount, the spreader including a lower surface configured to be directed at the soil and an upper surface configured to be directed away from the soil;
   a tip removably coupled to the spreader and configured to cut a furrow into the soil, and wherein the product is deposited into the furrow; and
   a soil gathering module attached to the mount at a location axially spaced along the mount from the spreader so as to be positioned above and partially overlap the upper surface of the spreader, the soil gathering module configured to gather soil lifted by the spreader and the tip and redirect the gathered soil to a position rearward of the soil opener.

2. The soil opener of claim 1 further comprising a spreader removably coupled to the mount and configured to deflect product delivered to the spreader outward and rearward into the soil, and wherein the tip is attached to the spreader.

3. The soil opener of claim 2 wherein an interface angle is defined between a leading edge of the mount and a leading edge of the spreader, and wherein the interface angle is greater than 10 degrees but less than 20 degrees.

4. The soil opener of claim 3 wherein the interface angle is positioned approximately 4.5 inches above a lower first angle created at the interface of the spreader and the tip.

5. The soil opener of claim 2 wherein the spreader is interchangeably attached to the mount.

6. The soil opener of claim 2 wherein the spreader has a leading edge coincident with a leading edge of a lower portion of the mount.

7. The soil opener of claim 6 wherein an interface angle is defined at an interface between the spreader and the tip, wherein the interface angle is greater than 25 degrees but less than 30 degrees.

8. The soil opener of claim 7 wherein the interface is approximately 4.0 inches above the tips.

9. The soil opener of claim 1 wherein the soil gathering module includes a pair of wings extending rearward and outward from opposite sides of the mount.

10. The soil opener of claim 9 wherein each wing has a downwardly extending tine configured to engage the soil as the soil opener is pulled through the soil and push the soil toward a center of the furrow.

11. The soil opener of claim 9 further comprising a damper that applies a substantially constant downforce on the pair of wings.

12. The soil opener of claim 11 wherein the damper includes a spring.

13. The soil opener of claim 9 further comprising a linkage arrangement pivotally coupling the pair of wings to the mount, and wherein the linkage arrangement allows the wings to rotate about an axis of rotation perpendicular to a direction of travel of the soil opener when the at least one of the wings encounters a field obstruction.

14. The soil opener of claim 1 further comprising first and second delivering channels integrally formed with the mount.

15. The soil opener of claim 14 wherein the first and second delivering channels are formed in a forward and rearward side of the mount.

16. The soil opener of claim 1 wherein the mount is centered on the shank.

17. The soil opener of claim 1 wherein the mount has a leading edge that narrows to a ridge having an included angle of less than 45 degrees.

18. The soil opener of claim 1 further comprising a pair of wings extending rearward and outward from the mount and wherein each wing has a downwardly extending tine defining a point angling inwardly toward the spreader and the tip.

* * * * *